(12) United States Patent
Tamagawa

(10) Patent No.: US 9,104,338 B2
(45) Date of Patent: Aug. 11, 2015

(54) NETWORK STORAGE SYSTEM, DISK ARRAY DEVICE, HOST DEVICE, ACCESS CONTROL METHOD, AND DATA ACCESS METHOD

(75) Inventor: Masahiro Tamagawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1319 days.

(21) Appl. No.: 12/588,226

(22) Filed: Oct. 8, 2009

(65) Prior Publication Data

US 2010/0100660 A1 Apr. 22, 2010

(30) Foreign Application Priority Data

Oct. 20, 2008 (JP) ................................. 2008-270050

(51) Int. Cl.
*G06F 3/06* (2006.01)

(52) U.S. Cl.
CPC .............. *G06F 3/0664* (2013.01); *G06F 3/067* (2013.01); *G06F 3/0626* (2013.01); *G06F 3/0689* (2013.01)

(58) Field of Classification Search
USPC ......................................................... 711/114
See application file for complete search history.

(56) References Cited

U.S. PATENT DOCUMENTS

| | | | |
|---|---|---|---|
| 6,968,425 B2 | 11/2005 | Hashimoto | |
| 7,404,021 B2 * | 7/2008 | Wilkins et al. | 710/74 |
| 7,441,095 B2 * | 10/2008 | Tamura et al. | 711/203 |
| 2004/0111560 A1 * | 6/2004 | Takase et al. | 711/114 |
| 2006/0168415 A1 | 7/2006 | Ishii et al. | |
| 2007/0245069 A1 | 10/2007 | Kikuchi | |

FOREIGN PATENT DOCUMENTS

| | | |
|---|---|---|
| JP | 6-4450 | 1/1994 |
| JP | 7-152491 | 6/1995 |
| JP | 2002-91706 | 3/2002 |
| JP | 2004-199420 A | 7/2004 |
| JP | 2006-79434 A | 3/2006 |
| JP | 2006-209237 | 8/2006 |
| JP | 2007-164318 A | 6/2007 |

OTHER PUBLICATIONS

Japanese Office Action dated Mar. 19, 2013, with English translation.
Japanese Office Action dated Aug. 27, 2013, with English translation.

* cited by examiner

*Primary Examiner* — Matthew Bradley
(74) *Attorney, Agent, or Firm* — McGinn IP Law Group, PLLC

(57) ABSTRACT

A network storage includes at least one host device, a plurality of disk array devices, an address map that is stored in one of the plurality of disk array devices and indicates a correspondence relation between a logical address to view the plurality of disk array devices as one storage device and a physical address of each of the plurality of disk array devices, a management master that is included in the host device or one of the plurality of disk array devices, an address map storing location information that is stored in the management master and indicates the disk array device that stores the address map and an address on which the address map is stored in the disk array device, and a command management unit that is included in the management master and transmits the address map storing location information to the host device.

21 Claims, 13 Drawing Sheets

FIG.3

| LOGICAL ADDRESS | PHYSICAL ADDRESS | |
|---|---|---|
| | DEVICE NUMBER | DEVICE INTERNAL ADDRESS |
| 0～1023 | 1 | 0～1023 |
| 1024～2047 | 1 | 1024～2047 |
| 2048～3071 | 2 | 0～1023 |
| 3072～4095 | 3 | 0～1023 |
| 4096～5119 | 1 | 2048～3071 |
| 5120～6143 | 2 | 1024～2047 |
| 6144～7167 | 2 | 2048～3071 |
| 7168～8191 | 3 | 1024～2047 |
| ..... | ..... | ..... |

FIG.5

| Ver. 4 | | |
|---|---|---|
| LOGICAL ADDRESS | PHYSICAL ADDRESS | |
| | DEVICE NUMBER | DEVICE INTERNAL ADDRESS |
| 0～1023 | 1 | 0～1023 |
| 1024～2047 | 1 | 1024～2047 |
| 2048～3071 | 2 | 0～1023 |
| 3072～4095 | 3 | 0～1023 |
| 4096～5119 | 1 | 2048～3071 |
| 5120～6143 | 2 | 1024～2047 |
| 6144～7167 | 2 | 2048～3071 |
| 7168～8191 | 3 | 1024～2047 |
| ..... | ..... | ..... |

FIG.10

| LOGICAL ADDRESS | | PHYSICAL ADDRESS | |
|---|---|---|---|
| | | DEVICE NUMBER | DEVICE INTERNAL ADDRESS |
| A | 0～1023 | 1 | 0～1023 |
| | 1024～2047 | 1 | 1024～2047 |
| | 2048～3071 | 2 | 0～1023 |
| | 3072～4095 | 3 | 0～1023 |
| | 4096～5119 | 1 | 2048～3071 |
| B | 5120～6143 | 2 | 1024～2047 |
| | 6144～7167 | 2 | 2048～3071 |
| | 7168～8191 | 3 | 1024～2047 |
| | ..... | ..... | ..... |

NETWORK STORAGE SYSTEM, DISK ARRAY DEVICE, HOST DEVICE, ACCESS CONTROL METHOD, AND DATA ACCESS METHOD

This application is based upon and claims the benefit of priority from Japanese Patent Application No. 2008-270050, filed on Oct. 10, 2008, the disclosure of which is incorporated herein in its entirety by reference.

TECHNICAL FIELD

The present invention relates to a network storage system, a disk array device, a host device, an access control method and a data access method.

BACKGROUND ART

In recent years, a system in which a large amount of data is used and stored is needed. Accordingly, a network storage system in which a plurality of disk array devices are connected to each other by a storage network has been built.

In such system, critical issues are a data sharing method and a system management method. Generally, these issues can be solved by treating a usable area as a virtual volume. For example, in a system in which a plurality of disk array devices are included, virtualization in which a plurality of magnetic disk devices are viewed as one magnetic disk device is achieved in order to manage the system easily.

For example, a system disclosed in Japanese Patent Application Laid-Open No. 2002-91706 comprises a mapping controller between a host and a storage network or between the storage network and a storage container. The mapping controller makes a virtual disk correspond to a storage container actually used.

A virtual disk system disclosed in Japanese Patent Application Laid-Open No. 1995-152491 converts a logical address of a virtual drive sent from an upper device into a physical address of a physical drive and has a table (virtual drive management table) to judge whether the physical drive corresponding to the logical address exists in a unit. By using the table, the virtual disk system performs a process in the unit when it is judged that the physical drive to be accessed exists in the unit and transfers an access request to an access control circuit of the other unit when it is judged that the physical drive to be accessed exists in the other unit.

As the other related technology, a virtualization device which virtualizes a storage area provided by a storage device is disclosed in Japanese Patent Application Laid-Open No. 2006-209237. An information conversion device which converts logical transfer information into physical transfer information between the upper device and a lower device is disclosed in Japanese Patent Application Laid-Open No. 1994-004450.

SUMMARY

An exemplary object of the invention is to provide a network storage system in which a plurality of disk array devices are virtualized without using a virtualization device, and to provide a disk array device, a host device, an access control method, and a data access method, that are used in the system.

A network storage system according to an exemplary aspect of the invention includes at least one host device, a plurality of disk array devices, an address map that is stored in one of the plurality of disk array devices and indicates a correspondence relation between a logical address to view the plurality of disk array devices as one storage device and a physical address of each of the plurality of disk array devices, a management master that is included in the host device or one of the plurality of disk array devices, an address map storing location information that is stored in the management master and indicates the disk array device that stores the address map and an address on which the address map is stored in the disk array device that stores the address map, and a command management unit that is included in the management master and transmits the address map storing location information to the host device that requested the storing location information.

A disk array device according to an exemplary aspect of the invention includes a management master, address map storing location information that is stored in the management master and indicates the disk array device or the other disk array device that stores an address map indicating a correspondence relation between a logical address to view the disk array device and at least one other disk array device as one storage device and a physical address of each of the disk array device and the at least one other disk array device and an address on which the address map is stored in the disk array device or the other disk array device that stores the address map, and a command management unit that is included in the management master and transmits the address map storing location information to a host device that requested the storing location information.

A host device according to an exemplary aspect of the invention includes a management master, address map storing location information that is stored in the management master and indicates a disk array device that stores an address map indicating a correspondence relation between a logical address to view a plurality of disk array devices as one storage device and a physical address of each of the plurality of disk array devices and an address on which the address map is stored in the disk array device that stores the address map, and a command management unit that is included in the management master and transmits the address map storing location information to the other host device that requested the storing location information.

An access control method for a host device connected to at least one other host device and a plurality of disk array devices, according to an exemplary aspect of the invention includes transmitting address map storing location information that indicates the disk array device that stores an address map indicating a correspondence relation between a logical address to view the plurality of disk array devices as one storage device and a physical address of each of the plurality of disk array devices and an address on which the address map is stored in the disk array device that stores the address map to the other host device that requested the storing location information.

An access control method for a disk array device connected to at least one host device and at least one other disk array device, according to an exemplary aspect of the invention includes transmitting address map storing location information that indicates the disk array device or the other disk array device that stores an address map indicating a correspondence relation between a logical address to view the disk array device and the at least one other disk array device as one storage device and a physical address of each of the disk array device and the at least one other disk array device and an address on which the address map is stored in the disk array device or the other disk array device that stores the address map to the host device that requested the storing location information.

A data access method for a system in which at least one host device is connected to a plurality of disk array devices, according to an exemplary aspect of the invention includes acquiring an address map from the disk array device based on address map storing location information that indicates the disk array device that stores an address map indicating a correspondence relation between a logical address to view the plurality of disk array devices as one storage device and a physical address of each of the plurality of disk array devices and an address on which the address map is stored in the disk array device that stores the address map in the host device, and accessing the disk array device from the host device based on the address map.

A network storage system according to an exemplary aspect of the invention includes at least one host device, a plurality of disk array devices, an address map for indicating a correspondence relation between a logical address to view the plurality of disk array devices as one storage device and a physical address of each of the plurality of disk array devices that is stored in one of the plurality of disk array devices, a management master included in the host device or one of the plurality of disk array devices, means for managing address map storing location information indicates the disk array device that stores the address map and an address on which the address map is stored in the disk array device that stores the address map that is included in the management master, and means for transmitting the address map storing location information to the host device that requested the storing location information that is included in the management master.

A disk array device according to an exemplary aspect of the invention includes a management master, means for managing address map storing location information indicates the disk array device or the other disk array device that stores an address map indicating a correspondence relation between a logical address to view the disk array device and at least one other disk array device as one storage device and a physical address of each of the disk array device and the at least one other disk array device and an address on which the address map is stored in the disk array device or the other disk array device that stores the address map that is included in the management master, and means for transmitting the address map storing location information to a host device that requested the storing location information that is included in the management master.

A host device according to an exemplary aspect of the invention includes a management master, means for managing address map storing location information that is stored in the management master and indicates a disk array device that stores an address map indicating a correspondence relation between a logical address to view a plurality of disk array devices as one storage device and a physical address of each of the plurality of disk array devices and an address on which the address map is stored in the disk array device that stores the address map that is included in the management master, and means for transmitting the address map storing location information to the other host device that requested the storing location information that is included in the management master.

An access control method for a host device connected to at least one other host device and a plurality of disk array devices, according to an exemplary aspect of the invention includes a step for transmitting address map storing location information that indicates the disk array device that stores an address map indicating a correspondence relation between a logical address to view the plurality of disk array devices as one storage device and a physical address of each of the plurality of disk array devices and an address on which the address map is stored in the disk array device that stores the address map to the other host device that requested the storing location information.

An access control method for a disk array device connected to at least one host device and at least one other disk array device, according to an exemplary aspect of the invention includes a step for transmitting address map storing location information that indicates the disk array device or the other disk array device that stores an address map indicating a correspondence relation between a logical address to view the disk array device and the at least one other disk array device as one storage device and a physical address of each of the disk array device and the at least one other disk array device and an address on which the address map is stored in the disk array device or the other disk array device that stores the address map to the host device that requested the storing location information.

A data access method for a system in which at least one host device is connected to a plurality of disk array devices, according to an exemplary aspect of the invention includes a step for acquiring the address map from the disk array device based on address map storing location information that indicates the disk array device that stores an address map indicating a correspondence relation between a logical address to view the plurality of disk array devices as one storage device and a physical address of each of the plurality of disk array devices and an address on which the address map is stored in the disk array device that stores the address map in the host device, and a step for accessing the disk array device from the host device based on the address map.

BRIEF DESCRIPTION OF THE DRAWINGS

Exemplary features and advantages of the present invention will become apparent from the following detailed description when taken with the accompanying drawings in which:

FIG. 3 is an exemplary diagram of an address map used in a network storage system according to the first exemplary embodiment.

FIG. 5 is an exemplary diagram showing an example of an address map used in a network storage system according to a second exemplary embodiment.

FIG. 10 is an exemplary diagram of an address map used in a network storage system according to the fourth exemplary embodiment.

EXEMPLARY EMBODIMENT

[First Exemplary Embodiment]

Figure 1:
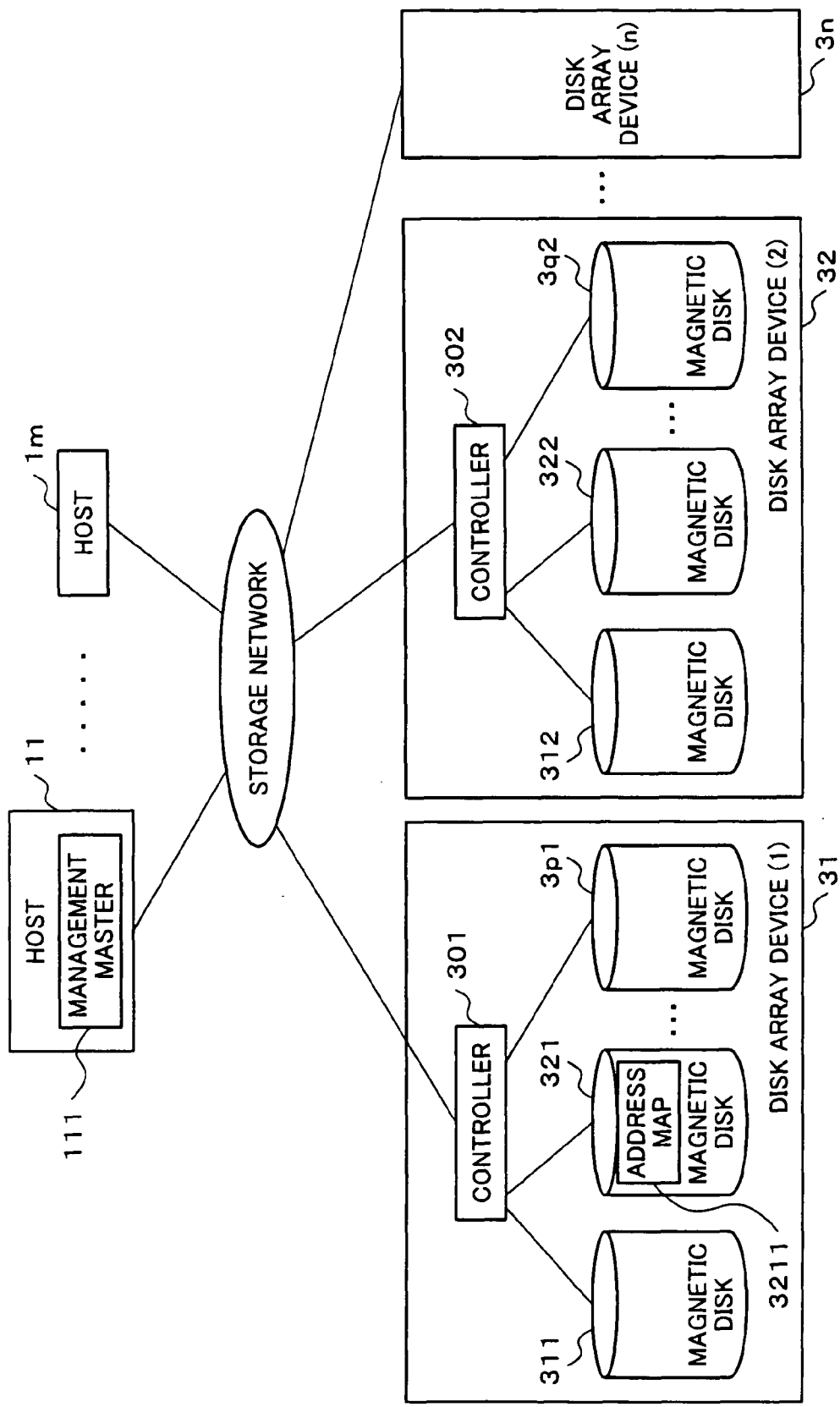
FIG. 1 is an exemplary diagram showing a configuration of a network storage system according to a first exemplary embodiment.

FIG. 1 is an exemplary diagram showing a configuration of a network storage system according to a first exemplary embodiment. The network storage system according to the first exemplary embodiment includes m hosts 11 to 1*m* (m is an arbitrary natural number) and n disk array devices 31 to 3*n* (n is an arbitrary natural number). The hosts and the disk array devices are connected via a storage network. Further, identifiers (device numbers) 1 to n are assigned to disk array devices 31 to 3*n*, respectively.

The host 11 includes a management master 111. The management master 111 manages information representing that an address map 3211 is stored in a magnetic disk 321.

The disk array device 31 includes a controller 301 and p magnetic disks 311 to 3*p*1 (p is an arbitrary natural number). The address map 3211 is stored in the magnetic disk 321.

The disk array device 32 includes a controller 302 and q magnetic disks 312 to 3*q*2 (q is an arbitrary natural number). Each of the disk array devices 33 to 3*n* also includes a controller and a magnetic disk like disk array device 32. However, the number of the magnetic disks is arbitrary determined for each disk array device.

Figure 2:
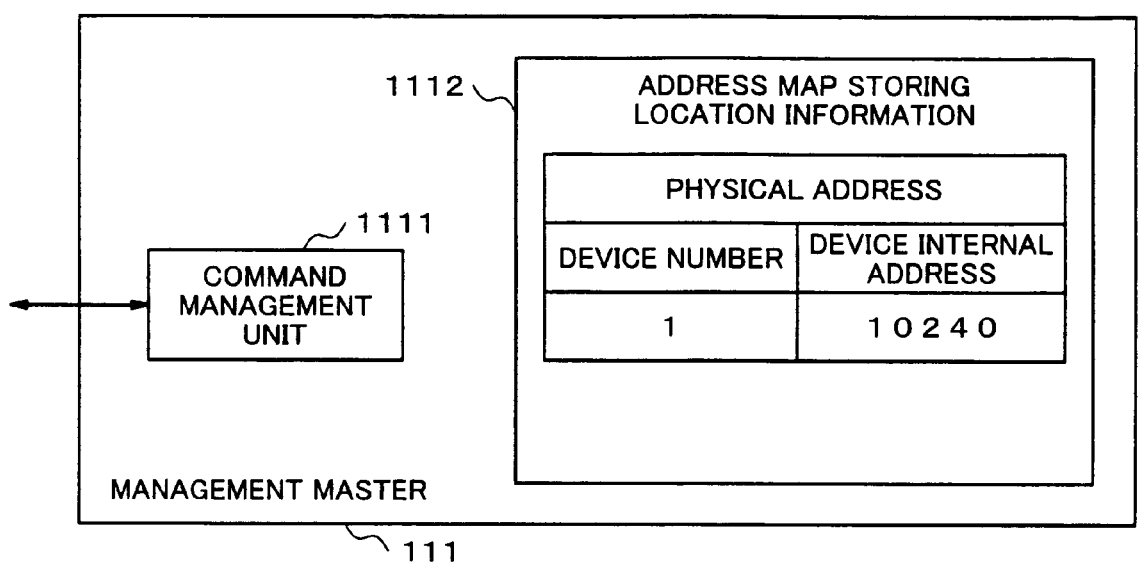
FIG. 2 is an exemplary diagram showing a configuration of a management master applied to a network storage system according to the first exemplary embodiment.

FIG. 2 is an exemplary diagram showing a configuration of a management master applied to the network storage system according to the first exemplary embodiment.

When a command management unit 1111 receives a query about an address map storing location from the host 11, the command management unit 1111 transmits information stored in an address map storing location information 1112 to the host 11. A device number and a device internal address of the disk array device in which the address map 3211 is stored are stored in the address map storing location information 1112.

FIG. 3 is an exemplary diagram of the address map used in the network storage system according to the first exemplary embodiment. In the address map, a logical address to treat a usable storage area as the virtual volume corresponds to the physical address including the device number and the device internal address of the disk array device which stores data actually one by one.

Figure 4:
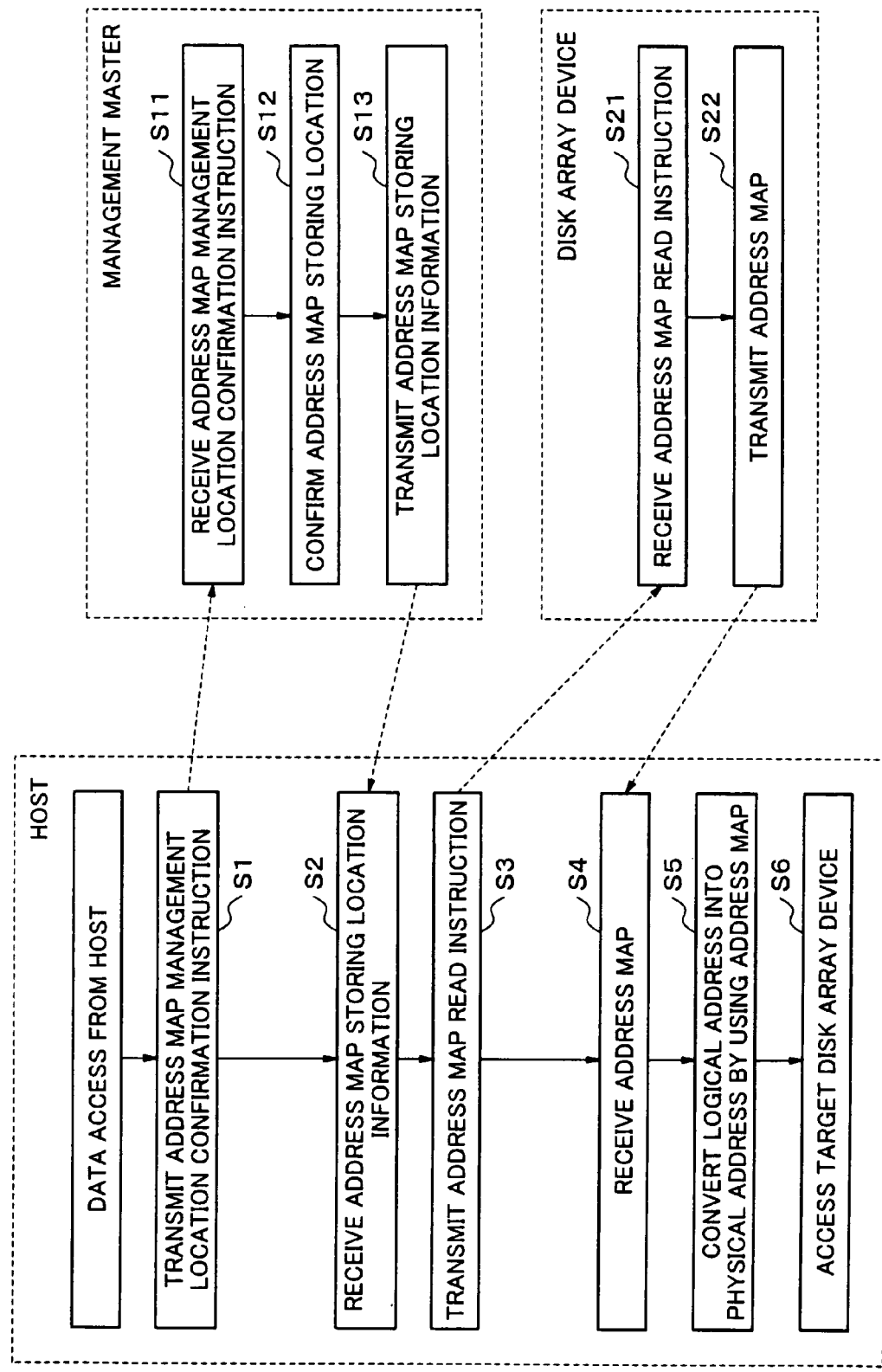
FIG. 4 is an exemplary diagram showing operation of a network storage system according to the first exemplary embodiment.

FIG. 4 is an exemplary diagram showing an operation of the network storage system according to the first exemplary embodiment. Operation of data access from a host to a disk array device will be described by using FIG. 4.

When the host 11 performs a data access, it transmits an address map management location confirmation instruction to the management master 111 (Step S1).

When the management master 111 receives the address map management location confirmation instruction (Step S11), the management master 111 extracts the device number "1" and the device internal address "10240" of the disk array device 31 which stores the address map 3211 from the address map storing location information 1112 (Step S12). The management master 111 transmits the extracted data to the host 11 (Step S13).

When the host 11 receives the information indicating the storing location of address map 3211 (Step S2), the host 11 generates an instruction to read out data of the device internal address "10240" of disk array device 31 in which the address map 3211 is stored based on the information indicating the received address map storing location, and transmits the instruction to the disk array device 31 as an address map read instruction (Step S3).

When the disk array device 31 storing the address map receives the address map read instruction (Step S21), it reads out the address map 3211 from the magnetic disk 331 according to the device internal address specified in the instruction and transmits data of the address map 3211 to the host 11 (Step S22).

When the host 11 receives the data (Step S4), it converts the logical address for performing the data access into the device internal address of the disk array device to which the data access is performed actually by using the address map 3211 (Step S5). The host 11 accesses one of the disk array devices 31 to 3*n* based on the address after the conversion (Step S6).

As a specific example, a case in which the network storage system shown in FIG. 1 manages the address map as shown in FIG. 2 and FIG. 3 and the host 1*m* writes data into the logical address "4096" will be described.

The host 1*m* transmits the address map storing location confirmation instruction to the management master 111. When the management master 111 receives the address map management location confirmation instruction, the command management unit 1111 transmits the device number "1" and the device internal address "10240" of the disk array device to the host 1*m* as the storing location information.

The host 1*m* reads out the address map 3211 which is written in the device internal address "10240" of the disk array device 31 whose device number is "1". The host 1*m* converts the logical address "4096" into the physical address (the device internal address "2048" of disk array device 31) and writes the data into the disk array device 31.

Further, when a host which does not include a management master accesses the disk array device, it may specify the host which includes the management master by asking the other hosts whether they include the management master via the storage network and transmit the address map management location confirmation instruction to the specified host which includes the management master via the storage network.

In FIG. 1, when the host 1*m* accesses the disk array devices 31 to 3*n*, it asks the other hosts whether they include the management master via the storage network. The host 1*m* receives an answer from the host 11 indicating that the host 11 includes the management master 111. After that, the host 1*m* transmits the address map management location confirmation instruction to the host 11 via the storage network. Namely, the host 1*m* carries out the processes in steps S1 and S2 of FIG. 4 via the storage network.

Further, the host not including the management master may transmit the address map management location confirmation instruction via the storage network without asking the other hosts by storing information for specifying the host including the management master in the host not including the management master in advance.

As described above, according to the first exemplary embodiment, the virtualization of the disk array device can be realized without adding a new device because the network storage system does not need the virtualization device. Therefore, the data access performance is not degraded because a process in the virtualization device does not become a bottleneck.

Further, the management information (the address map) can be treated like the data in the magnetic disk and copying and back-up of the management information can be made easily because the management information exists as data in the magnetic disk.

Moreover, it is not necessary to store the unnecessarily redundant management information in the network storage system because not all the disk array devices need to store the address map.

[Second Exemplary Embodiment]

Figure 6:
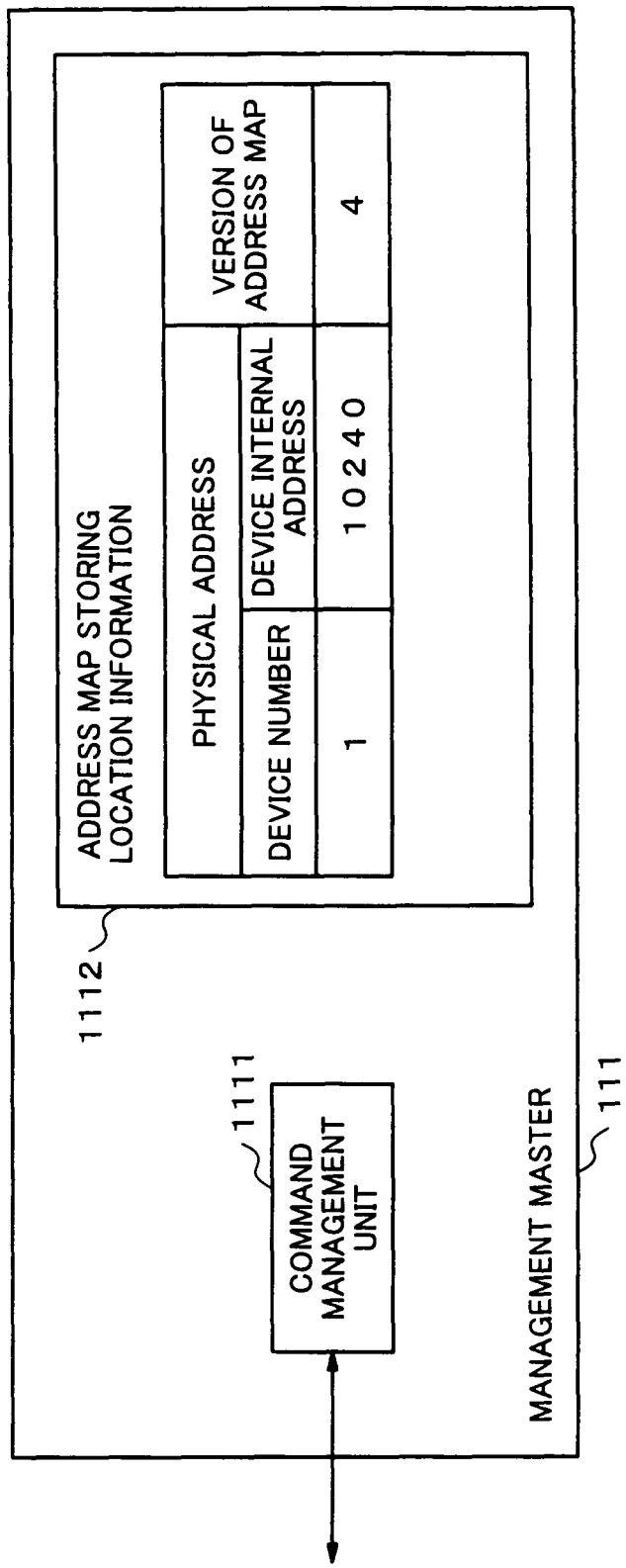
FIG. 6 is an exemplary diagram showing a configuration of a management master applied to a network storage system according to the second exemplary embodiment.

Next, a second exemplary embodiment will be described. A configuration of a storage system according to the second exemplary embodiment is the same as that of the first exemplary embodiment. FIG. 5 is an exemplary diagram showing an example of an address map used in a network storage system according to the second exemplary embodiment. As shown in FIG. 5, in the second exemplary embodiment, version information indicating the number of editions is added to the address map. FIG. 6 is an exemplary diagram showing a configuration of the management master applied to the network storage system according to the second exemplary embodiment. As shown in FIG. 6, in the second exemplary embodiment, the version information is also registered in the address map storing location information in the management master.

In the second exemplary embodiment, when the host which has already acquired the address map accesses the disk array device, the host confirms whether the version of the address map which has been already acquired is the same as the version registered in the address map storing location information before transmitting the address map management location confirmation instruction to the management master. When these are the same as each other, the host does not acquire the latest address map newly because the host has been already acquired the latest address map. Accordingly, the host accesses a target disk array device by using the address map which has been already acquired.

When these are different from each other, the host acquires the address map by performing the process shown in FIG. 4 because an address map which is newer than the address map which has been already acquired by the host exists.

The other configurations and operation of the second exemplary embodiment are the same as those of the first exemplary embodiment. Therefore, overlapping descriptions thereof will be omitted.

In the second exemplary embodiment, the host which can normally access the target disk array device by using the acquired address map does not read the address map from the magnetic disk. Therefore, an unnecessary access to the magnetic disk device can be reduced and a load on the magnetic disk device can be reduced.

[Third Exemplary Embodiment]

Figure 7:
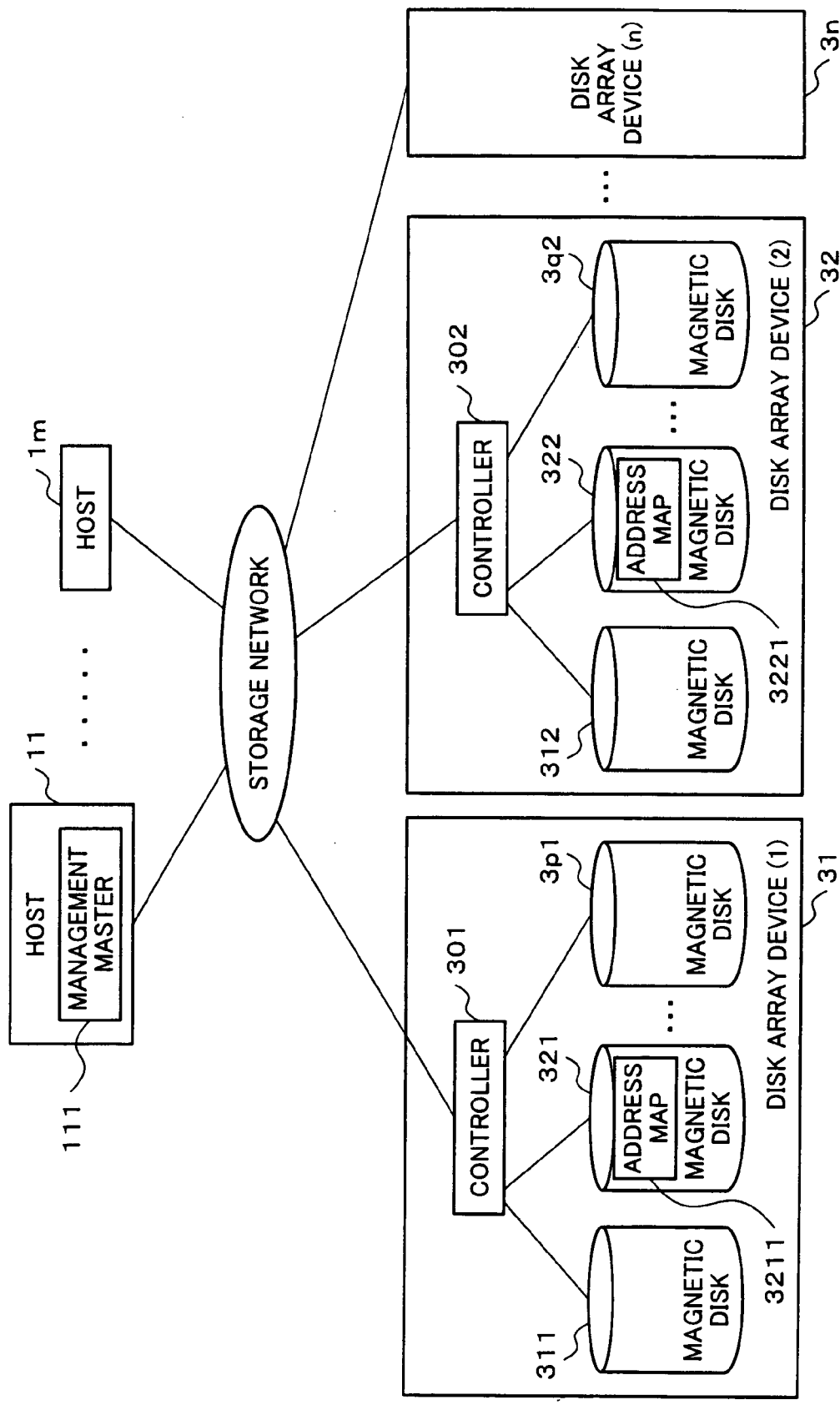
FIG. 7 is an exemplary diagram showing a configuration of a network storage system according to a third exemplary embodiment.

Next, a third exemplary embodiment will be described. FIG. 7 is an exemplary diagram showing a configuration of a network storage system according to the third exemplary embodiment. In the third exemplary embodiment, an address map is stored in not only disk array device 31 but also disk array device 32. The version information which indicates the number of editions is added to the address map 3211 and address map 3221 like the second exemplary embodiment.

Figure 8:
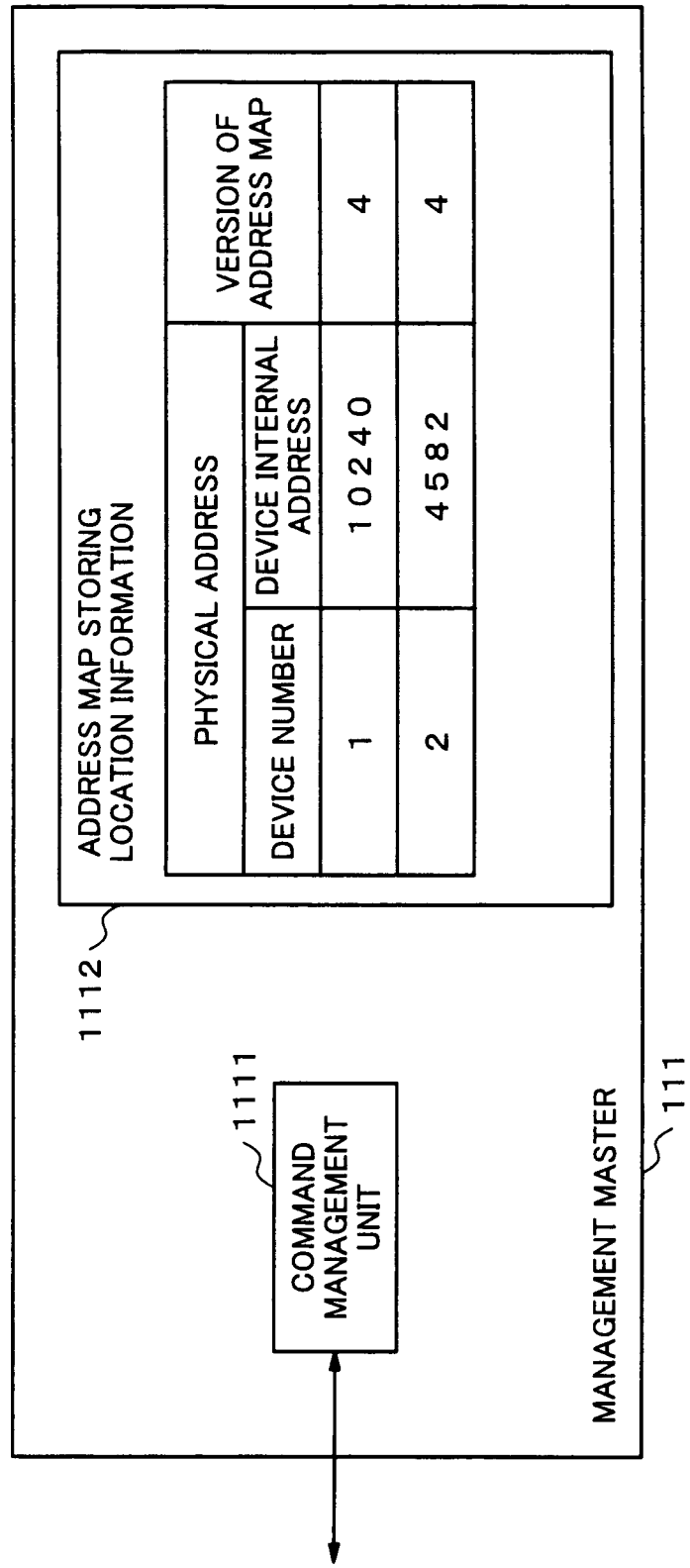
FIG. 8 is an exemplary diagram showing a configuration of a management master applied to a network storage system according to the third exemplary embodiment.

FIG. 8 is an exemplary diagram showing a configuration of a management master which is applied to the network storage system according to the third exemplary embodiment. As shown in FIG. 8, in the third exemplary embodiment, physical addresses corresponding to the address maps 3211 and 3221 and the version information indicating the number of editions of the address maps stored in the physical addresses are stored in address map storing location information 1112 provided in the management master 111.

When the management master 111 receives a query about an address map storing location from the hosts 11 to 1n, it transmits an address corresponding to either the address map 3211 or address map 3221 among information stored in the address map storing location information 1112 to the host which sent the query.

When the version of the address map 3211 is the same as the version of the address map 3221, an arbitrary method can be used to decide which one of an address corresponding to the address map 3211 or an address corresponding to the address map 3221 will be transmitted to the host. In this case, it is desirable that the management master 111 determines the address to be transmitted so that the number of times of reading the address map is not biased toward the address map 3211 or address map 3221. For example, the management master 111 may transmit the address corresponding to the address map 3211 and the address corresponding to the address map 3221 alternately.

In a transient state in which for example, the address map is updated, a case in which the update of one address map has been completed but the update of the other address map has not been completed may occur. In such case, the management master 111 uses only the address map whose update has been completed.

Accordingly, when the version of the address map 3211 is different from the version of the address map 3221, the management master 111 transmits the device number and the device internal address of the disk array device in which the latest address map is stored based on the version information included in the address map storing location information 1112 to the host.

In the third exemplary embodiment, when the information on the address map 3211 stored in the disk array device 31 is the same as the information on the address map 3221 stored in the disk array device 32, the access to the disk array devices 31 and 32 from the hosts 11 to 1n can be spread.

When the information on the address map 3211 is different from the information on the address map 3221, the host can access the disk array devices 31 to 3n certainly because the host uses the latest address map.

Further, in the above description, a case in which two address maps are allocated has been described as an example. However, the operation of the network storage system in which three or more address maps are allocated and stored in the disk array devices 31 to 3n is the same as the operation of the network storage system described above. When three or more address maps are allocated, it is desirable that the management master 111 determines the address to be transmitted so that the number of times of reading the address map is not biased toward a specific disk array device and all the address maps are selected equally.

In the network storage system according to the third exemplary embodiment, concentration of access to a specific disk array device can be avoided because the address maps are stored in a plurality of disk array devices.

Moreover the storage capacity of the disk array device can be utilized effectively because not all disk array devices need the address map.

[Fourth exemplary Embodiment]

Figure 9:
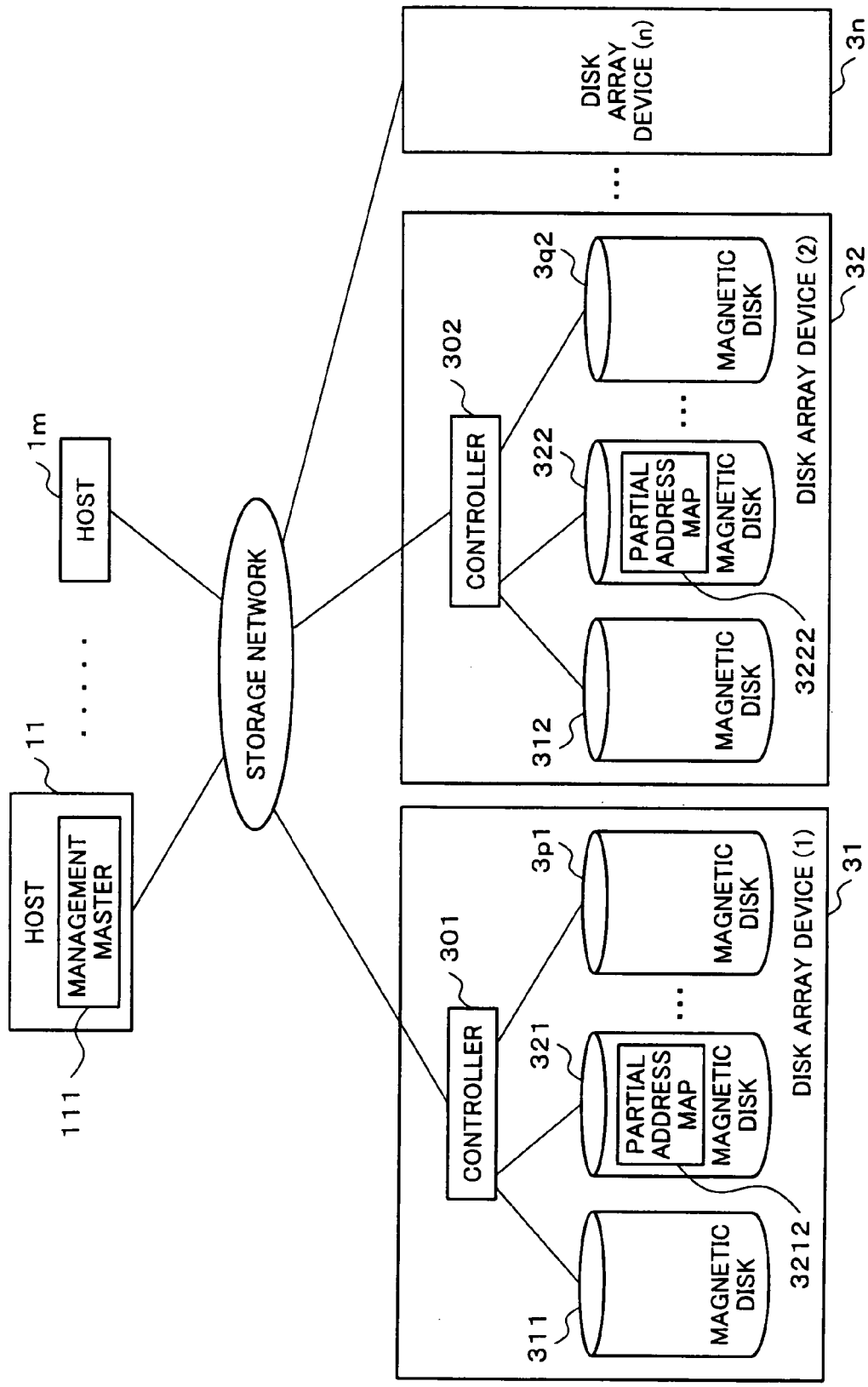
FIG. 9 is an exemplary diagram showing a configuration of a network storage system according to a fourth exemplary embodiment.

Next, a fourth exemplary embodiment will be described. FIG. 9 is an exemplary diagram showing a configuration of a network storage system according to the fourth exemplary embodiment. In the fourth exemplary embodiment, a partial address map 3212 is stored in the magnetic disk 321 and the partial address map 3222 is stored in the magnetic disk 322.

FIG. 10 is an exemplary diagram of an address map used in the network storage system according to the fourth exemplary embodiment. As shown in FIG. 10, the address map is divided into two parts, "A" and "B", and one part corresponds to the partial address map 3212 and the other part corresponds to the partial address map 3222. In FIG. 10, part "A" corresponds to the partial address map 3212 and part "B" corresponds to the partial address map 3222.

Figure 11:
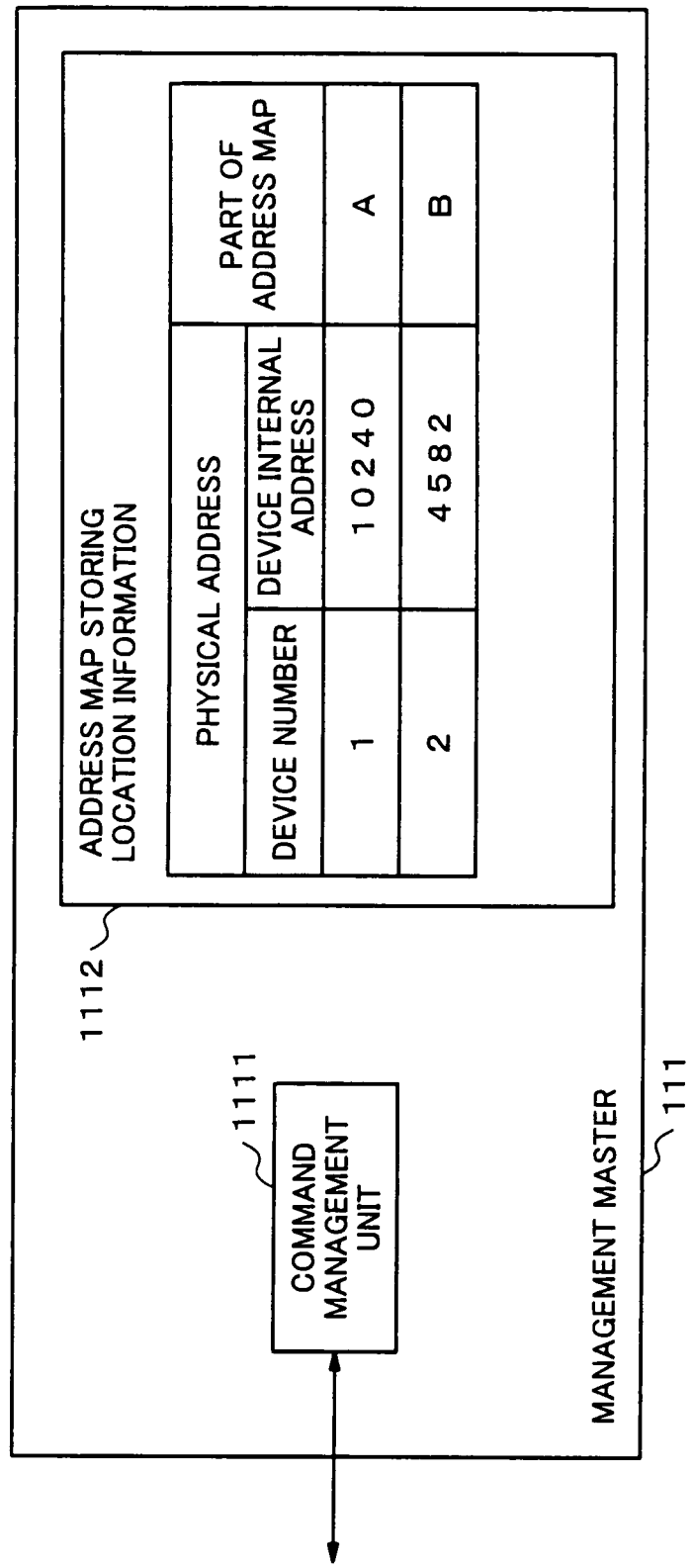
FIG. 11 is an exemplary diagram showing a configuration of a management master applied to a network storage system according to the fourth exemplary embodiment.

FIG. 11 is an exemplary diagram showing a configuration of the management master which is applied to the network storage system according to the fourth exemplary embodiment. As shown in FIG. 11, an address corresponding to each of the partial address maps 3212 and 3222 and part information which indicates the part on the address map are stored in the address map storing location information 1112.

In the fourth exemplary embodiment, when the management master 111 receives the address map management location confirmation instruction from the host, the management master 111 extracts the device number "1" and the device internal address "10240" of the disk array device 31 which stores the partial address map 3212 and the device number "2" and the device internal address "4582" of the disk array device 32 which stores the partial address map 3222 from data of the address map storing location information 1112 and returns the extracted data to the host.

The host reads out the partial address map 3212 from the magnetic disk 321 and the partial address map 3222 from the magnetic disk 322, and acquires one address map.

In the fourth exemplary embodiment, one address map is divided into plural parts and those parts are stored in a different disk array device, respectively. Therefore, a network storage system can be established without using a disk array device including a magnetic disk which has enough capacity to store the one address map.

Figure 12:
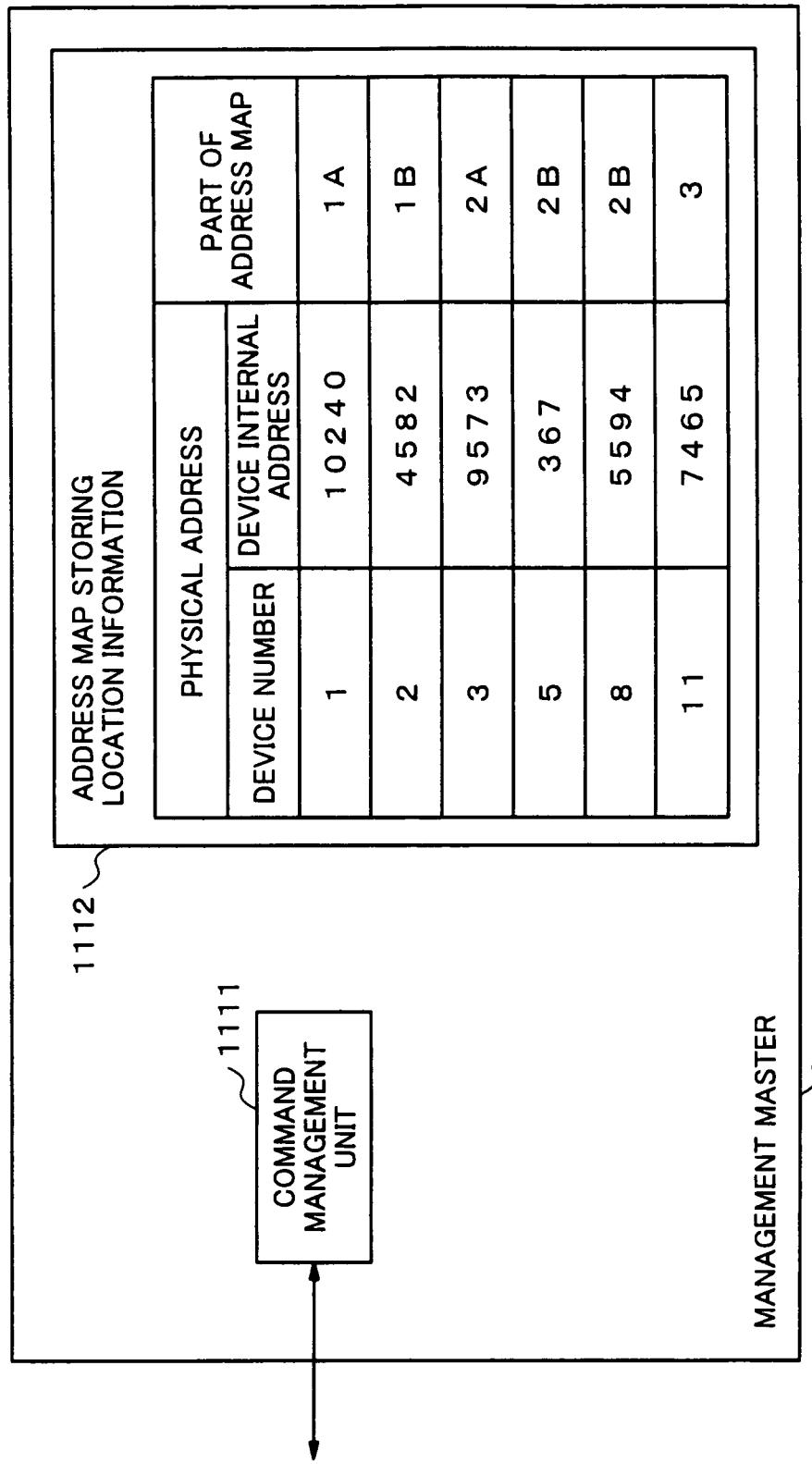
FIG. 12 is an exemplary diagram showing another configuration of a management master applied to a network storage system according to the fourth exemplary embodiment.

FIG. 12 is an exemplary diagram showing another configuration of the management master which is applied to the network storage system according to the fourth exemplary embodiment. In FIG. 11, one address map is divided into plural parts and those parts are stored in a plurality of different magnetic disks. In FIG. 12, two or more address maps are divided into plural parts and those parts are stored in a plurality of different magnetic disks. In this configuration, one address map may be selected and used among them like the third exemplary embodiment. Further, an address map which is stored after division and an address map which is stored without division may be used together.

[Fifth exemplary Embodiment]

Figure 13:
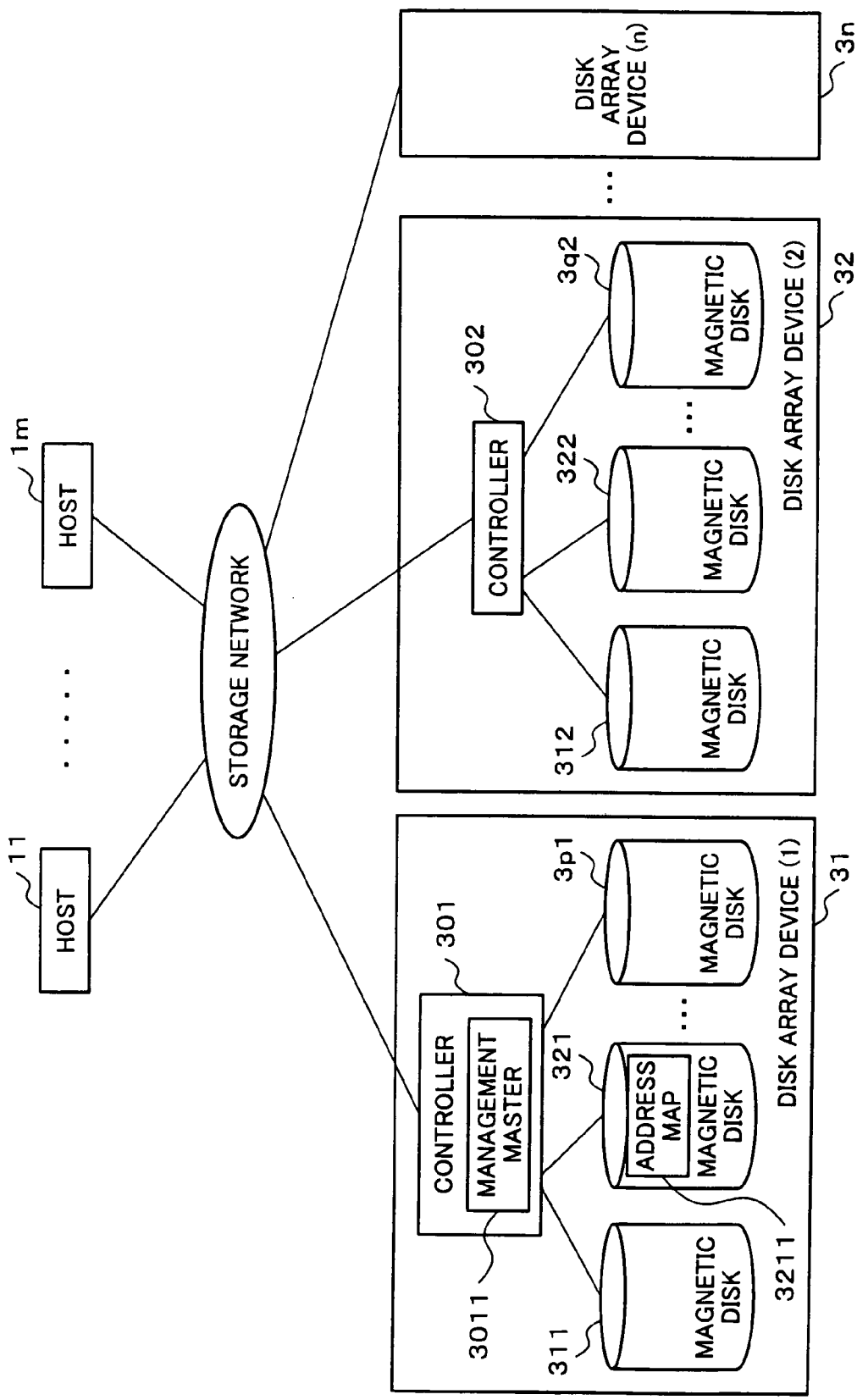
FIG. 13 is an exemplary diagram showing a configuration of a network storage system according to a fifth exemplary embodiment.

Next, a fifth exemplary embodiment will be described. FIG. 13 is an exemplary diagram showing a configuration of a network storage system according to the fifth exemplary embodiment. In the fifth exemplary embodiment, the management master 3011 is allocated in the controller 301 in the disk array device 31. This is a different point from the first exemplary embodiment.

In the fifth exemplary embodiment, when the host accesses the disk array device, the host specifies the disk array device which includes the management master by asking the disk array devices whether they include the management master via the storage network. The host transmits the address map management location confirmation instruction to the specified disk array device which includes the management master via the storage network.

In FIG. 13, when the hosts 11 to 1m access the disk array devices 31 to 3n, the hosts 11 to 1m ask the disk array devices 31 to 3n whether they include the management master via the storage network. The hosts 11 to 1m receive an answer from the disk array device 31 which indicates that the disk array device 31 includes the management master 3011. After that, the hosts 11 to 1m transmit the address map management location confirmation instruction to the disk array device 31 via the storage network. Namely, the hosts 11 to 1m carry out the process in steps S1 and S2 of FIG. 4 via the storage network.

When information for specifying the disk array device which includes the management master is stored in each host in advance, the address map management location confirmation instruction may be transmitted via the storage network without asking the disk array device.

In the fifth exemplary embodiment, the management master 3011 is allocated in the disk array device 31 and all hosts 11 to 1m communicate with the management master 3011 via the storage network. A flow of operation of the fifth exemplary embodiment is the same as that of the first exemplary embodiment. Therefore, the detailed description will be omitted.

In the fifth exemplary embodiment, the management master is allocated in the disk array device in the configuration of the first exemplary embodiment. However, the management master may be allocated in the disk array device in the similar configuration to the second to fourth exemplary embodiments.

Further, each above-mentioned exemplary embodiment is an example of the preferred exemplary embodiment of the present invention and the present invention is not limited to these.

For example, in the above-mentioned exemplary embodiments, a configuration in which a disk array device includes a plurality of magnetic disks has been described as an example. However, the similar effect can also be obtained by using a disk array device which includes a plurality of optical disks or magneto-optical disks.

Further, the process to inquire the version of the address map which is described in the second exemplary embodiment may be performed in the similar configuration to the third to fifth exemplary embodiments (that is, the configuration in which a plurality of address maps exist, the configuration in which an address map is divided into some parts, or the configuration in which the management master is allocated in the magnetic disk device).

Thus, the present invention can be realized using various configurations.

In order to achieve virtualization of a plurality of disk array devices, it is necessary to manage a correspondence relation between a logical address for accessing the virtualized disk from the host and a physical address in which information is stored actually. Therefore, it is necessary to allocate a virtualization device which manages the correspondence relation information in the system.

Namely, in a system disclosed in Japanese Patent Application Laid-Open No. 2002-91706, the configuration of the system becomes complicated because the virtualization device is needed.

In a system disclosed in Japanese Patent Application Laid-Open No. 2002-91706, when information indicating the correspondence relation between the logical address and the physical address is lost, data cannot be read out. For this reason, a duplication of the virtualization device or the like is needed to improve the reliability of the system. Therefore, the configuration of the system becomes complicated.

Namely, in the system disclosed in Japanese Patent Application Laid-Open No. 2002-91706 which uses the virtualization device, information indicating a correspondence relation between a virtual disk provided in the virtualization device and a storage container used actually is important. Therefore, it is necessary to create a back-up copy of the information on the correspondence relation.

Moreover, in the system using the virtualization device, when a load is concentrated on the virtualization device, the process performed in the virtualization device becomes a bottleneck and the data access performance may be degraded even when a load on the disk array device side is not large.

On the other hand, in a virtual disk system disclosed in Japanese Patent Application Laid-Open No. 1995-152491, a virtual drive management table is provided as management information in all units (it corresponds to the disk array device in the network storage system). This configuration corresponds to a configuration in which a virtualization device disclosed in Japanese Patent Application Laid-Open No. 2002-91706 is provided in all units.

In a virtual disk system disclosed in Japanese Patent Application Laid-Open No. 1995-152491, the virtual drive management table is provided in the all units although it is used in the unit which receives an access request. Accordingly, the unnecessarily redundant management information is stored in the unit. Therefore, a capacity of a storage device which stores the management information is not used effectively.

An exemplary advantage according to the invention is that a network storage system in which a plurality of disk array devices are virtualized without using a virtualization device is provided, and a disk array device, a host device, an access control method, and a data access method which are used in the system are provided.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A network storage system, comprising:
   at least one host device; and
   a plurality of disk array devices each including a controller,
   wherein an address map that indicating a correspondence relation between a logical address to view said plurality of disk array devices as one storage device and a physical address of each of said plurality of disk array devices is stored in one of said plurality of disk array devices,
   wherein said host device or said controller of one of said plurality of disk array devices includes a management master, and
   wherein said management master includes:
      an address map storing location information indicates said disk array device that stores said address map and an address on which said address map is stored in said disk array device that stores said address map; and
      a command management unit that transmits said address map storing location information to said host device that requested said storing location information.

2. The network storage system according to claim 1, wherein said address map storing location information includes a pair of an identifier of said disk array device that stores said address map and a device internal address on which said address map is stored in said disk array device that stores said address map.

3. The network storage system according to claim 2, wherein:
   said address map storing location information includes at least two pairs of said identifier of said disk array device that stores said address map and said device internal address on which said address map is stored in said disk array device that stores said address map, and
   said management master transmits one of said at least two pairs to said host device that requested said storing location information.

4. The network storage system according to claim 3, wherein said management master selects one pair from said at least two pairs and transmits the selected pair to said host device that requested said storing location information.

5. A disk array device, comprising a controller, wherein said controller includes a management master,
   wherein said management master includes:
      address map storing location information that indicates said disk array device or the other disk array device that stores an address map indicating a correspondence relation between a logical address to view said disk array device and at least one other disk array device as one storage device and a physical address of each of said disk array device and said at least one other disk array device and an address on which said address map is stored in said disk array device or said other disk array device that stores said address map; and
      a command management unit that transmits said address map storing location information to a host device that requested said storing location information.

6. The disk array device according to claim 5, wherein said address map storing location information includes a pair of an identifier of said disk array device or said other disk array device that stores said address map and a device internal address on which said address map is stored in said disk array device or said other disk array device that stores said address map.

7. The disk array device according to claim 6, wherein said address map storing location information includes at least two pairs of said identifier of said disk array device or said other disk array device that stores said address map and said device internal address on which said address map is stored in said disk array device or said other disk array device that stores said address map, and
   said management master transmits one of said at least two pairs to said host device that requested said storing location information.

8. The disk array device according to claim 7, wherein said management master selects one pair from said at least two pairs and transmits the selected pair to said host device that requested said storing location information.

9. A host device, comprising a management master, said management master including:
   address map storing location information that indicates a disk array device that stores an address map indicating a correspondence relation between a logical address to view a plurality of disk array devices as one storage device and a physical address of each of said plurality of disk array devices and an address on which said address map is stored in said disk array device that stores said address map; and
   a command management unit that transmits said address map storing location information to another host device that requested said storing location information.

10. The host device according to claim 9, wherein said address map storing location information includes a pair of an identifier of said disk array device that stores said address map and a device internal address on which said address map is stored in said disk array device that stores said address map.

11. The host device according to claim 10, wherein:
said address map storing location information includes at least two pairs of said identifier of said disk array device that stores said address map and said device internal address on which said address map is stored in said disk array device that stores said address map, and
said management master transmits one of said at least two pairs to said other host device that requested said storing location information.

12. The host device according to claim 11, wherein said management master selects one pair from said at least two pairs and transmits the selected pair to said other host device that requested said storing location information.

13. An access control method for a host device connected to at least one other host device and a plurality of disk array devices, said method comprising:
transmitting address map storing location information that indicates said disk array device that stores an address map indicating a correspondence relation between a logical address to view said plurality of disk array devices as one storage device and a physical address of each of said plurality of disk array devices and an address on which said address map is stored in said disk array device that stores said address map to said other host device that requested said storing location information.

14. An access control method for a disk array device connected to at least one host device and at least one other disk array device, said method comprising:
transmitting address map storing location information that indicates said disk array device or said other disk array device that stores an address map indicating a correspondence relation between a logical address to view said disk array device and said at least one other disk array device as one storage device and a physical address of each of said disk array device and said at least one other disk array device and an address on which said address map is stored in said disk array device or said other disk array device that stores said address map to said host device that requested said storing location information.

15. A data access method for a system in which at least one host device is connected to a plurality of disk array devices, said method comprising:
acquiring an address map indicating a correspondence relation between a logical address to view said plurality of disk array devices as one storage device and a physical address of each of said plurality of disk array devices from said disk array device that stores said address map based on address map storing location information that indicates said disk array device that stores said address map and an address on which said address map is stored in said disk array device that stores said address map in said host device; and
accessing said disk array device from said host device based on said address map.

16. A network storage system, comprising:
at least one host device;
a plurality of disk array devices, each including a controller; and
an address map for indicating a correspondence relation between a logical address to view said plurality of disk array devices as one storage device and a physical address of each of said plurality of disk array devices that is stored in one of said plurality of disk array devices,
wherein said host device or said controller of one of said plurality of disk array devices includes a management master, and;
wherein said management master includes:
means for managing address map storing location information indicating said disk array device that stores an address map and an address on which said address map is stored in said disk array device that stores said address map; and
means for transmitting said address map storing location information to said host device that requested said storing location information.

17. A disk array device, comprising a management master, said management master including:
means for managing address map storing location information indicating said disk array device or the other disk array device that stores an address map indicating a correspondence relation between a logical address to view said disk array device and at least one other disk array device as one storage device and a physical address of each of said disk array device and said at least one other disk array device and an address on which said address map is stored in said disk array device or said other disk array device that stores said address map; and
means for transmitting said address map storing location information to a host device that requested said storing location information.

18. A host device, comprising a management master, said management master including:
means for managing address map storing location information that is stored in said management master and indicates a disk array device that stores an address map indicating a correspondence relation between a logical address to view a plurality of disk array devices as one storage device and a physical address of each of said plurality of disk array devices and an address on which said address map is stored in said disk array device that stores said address map; and
means for transmitting said address map storing location information to the other host device that requested said storing location information.

19. An access control method for a host device connected to at least one other host device and a plurality of disk array devices, said method comprising:
a step for transmitting address map storing location information that indicates said disk array device that stores an address map indicating a correspondence relation between a logical address to view said plurality of disk array devices as one storage device and a physical address of each of said plurality of disk array devices and an address on which said address map is stored in said disk array device that stores said address map to said other host device that requested said storing location information.

20. An access control method for a disk array device connected to at least one host device and at least one other disk array device, said method comprising:
a step for transmitting address map storing location information that indicates said disk array device or said other disk array device that stores an address map indicating a correspondence relation between a logical address to view said disk array device and said at least one other disk array device as one storage device and a physical address of each of said disk array device and said at least one other disk array device and an address on which said address map is stored in said disk array device or said other disk array device that stores said address map to said host device that requested said storing location information.

21. A data access method for a system in which at least one host device is connected to a plurality of disk array devices, said method comprising:
   a step for acquiring an address map indicating a correspondence relation between a logical address to view said plurality of disk array devices as one storage device and a physical address of each of said plurality of disk array devices from said disk array device that stores said address map based on address map storing location information that indicates said disk array device that stores said address map and an address on which said address map is stored in said disk array device that stores said address map in said host device; and
   a step for accessing said disk array device from said host device based on said address map.

* * * * *